United States Patent [19]

Driscoll et al.

[11] 3,941,540
[45] *Mar. 2, 1976

[54] SPRUE BUSHING FOR A SINGLE CAVITY OR CENTER SPRUED MOLD

[75] Inventors: James Robert Driscoll, Centerville; Earl Edward Clark, Dayton; Thomas James Haas, Kettering, all of Ohio

[73] Assignee: Diamond Tool & Die Company, Dayton, Ohio

[ * ] Notice: The portion of the term of this patent subsequent to Oct. 23, 1990, has been disclaimed.

[22] Filed: June 14, 1973

[21] Appl. No.: 369,917

Related U.S. Application Data

[63] Continuation of Ser. No. 160,317, July 7, 1971, Pat. No. 3,767,340.

[52] U.S. Cl............................ 425/245 NS; 425/243
[51] Int. Cl.[2]........................................... B29F 1/03
[58] Field of Search........ 425/245 R, 146, 252, 247, 425/243, DIG. 227, 245 NS

[56] References Cited
UNITED STATES PATENTS

| 2,911,680 | 11/1959 | Kelly | 425/243 X |
|---|---|---|---|
| 3,010,156 | 11/1961 | Smith | 425/DIG. 227 X |
| 3,231,938 | 2/1966 | Seymour | 425/146 |
| 3,758,248 | 9/1973 | Drazick | 425/245 NS X |

FOREIGN PATENTS OR APPLICATIONS

| 1,042,226 | 10/1958 | Germany | 425/245 NS |
| 563,182 | 5/1957 | Italy | 425/247 |
| 1,043,055 | 9/1966 | United Kingdom | 425/247 |

Primary Examiner—Francis S. Husar
Assistant Examiner—David S. Safran
Attorney, Agent, or Firm—Jacox & Meckstroth

[57] ABSTRACT

Plastics material is injected into a single cavity mold through a sprue bushing which has a cylindrical base portion with a semispherical seat within one end for receiving the nozzle of an injection molding machine. A cylindrical nose portion of smaller diameter, projects from the base portion and includes a flat end or tip surface which is adapted to be positioned flush with the cavity and has a discharge orifice connecting with an axially extending cylindrical chamber within the body. A valve member is supported for axial movement within the chamber and has a cylindrical tip portion which normally closes the discharge orifice under the bias of a series of spring washers confined within the chamber adjacent the opposite end of the valve member. The plastics material is directed from the nozzle seat to the chamber through a plurality of passages which extend around the spring washers. An elongated heating element is located within the valve member and is supplied with power through leads which extend rearwardly through the washers and through an outwardly extending hole within the body. A band type electrical heating element surrounds the base portion of the body.

5 Claims, 3 Drawing Figures

U.S. Patent   March 2, 1976   3,941,540
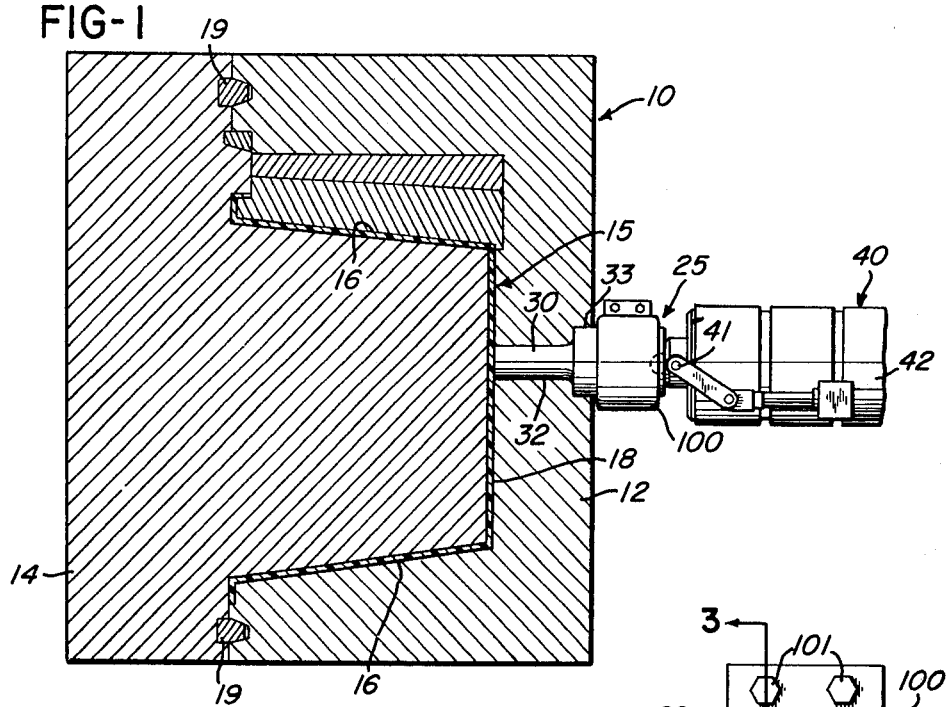
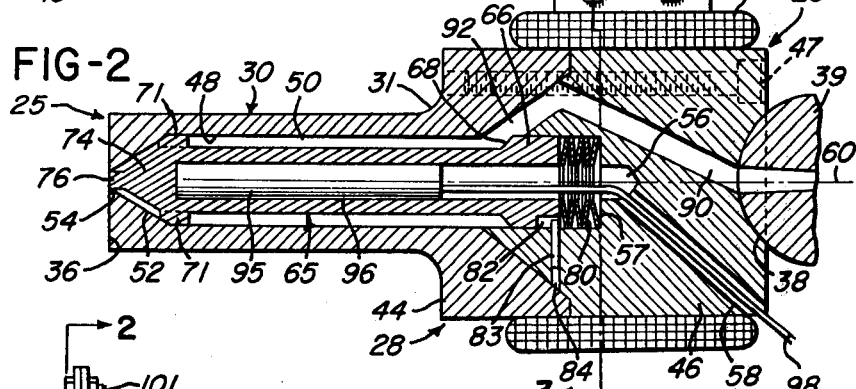
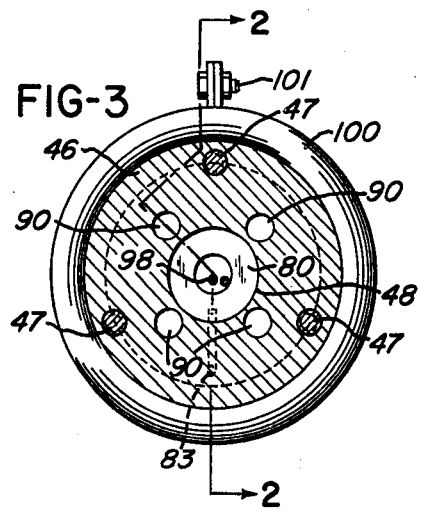
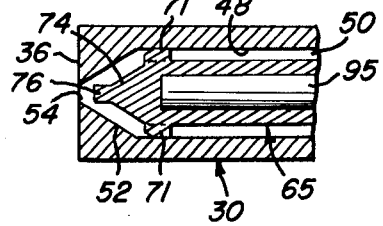

SPRUE BUSHING FOR A SINGLE CAVITY OR CENTER SPRUED MOLD

RELATED APPLICATION

This application is a continuation of Ser. No. 160,317, filed July 7, 1971, now issued as U.S. Pat. No. 3,767,340.

BACKGROUND OF THE INVENTION

In the art of injecting a thermoplastics material from an injection molding machine into a single cavity mold, it is common to use a sprue bushing which extends from the mold cavity through a wall of the mold and which has a semispherical seat for receiving the nozzle of the injection molding machine. The standard sprue bushing includes a 2-inch diameter base portion from which extends a 1-inch diameter tip or nose portion and is usually press fitted into a counterbored hole which extends generally to the center of the mold cavity. A tapered hole extends axially within the bushing from the part spherical nozzle seat to the flat end surface of the nose portion which is located flush with the mold surface defining the cavity. After a part or article has been molded and cooled, the mold is opened and the article is ejected with a projecting sprue integrally attached to the article. The removing of the sprue from the article requires another operation, and frequently the portion of the article from where the sprue is removed, must be machined to provide a surface of satisfactory appearance.

A number of methods have been proposed or used to eliminate the secondary operations of removing the sprue from a molded article and of surface finishing the article. For example, an internal heater has been mounted within the sprue bushing so that the plastics material confined within the sprue bushing after the molding operation, remains in a molten condition and does not solidify with the plastics material within the mold cavity. When the mold is opened, only the small portion of the plastics material located molding operation, remains in a molten condition and does not solidify with the plastics material within the mold cavity. When the mold is opened, only the small portion of the plastics material located within the discharge orifice of the sprue bushing, remains attached to the part. While on some parts, it is not necessary to remove this small projection remaining on the molded plastic part, on other parts, it is necessary that this projection be machined, thus requiring a secondary operation.

In some forms of multiple cavity injection plastic molds, a series of valve members are located within the runner passage with one valve member for each mold cavity. Each valve member has a pointed tip portion which normally seats on a conical discharge orifice under the pressure exerted by a coil compression spring pressing on the opposite end of the valve member. When the plastics material within the runner passage reaches a predetermined pressure, the valve members shift to open positions allowing the plastics material to flow into the corresponding mold cavities. It has also been proposed to insert electrical heating elements within the nozzle members of a multiple cavity mold to help prevent the plastics material within the runner passages from solidifying with the molded part. Such nozzle members within the runner for a multiple cavity mold are shown in Canadian Pat. No. 658,976.

SUMMARY OF THE INVENTION

The present invention is directed to an improved sprue bushing which is particularly suited for use with a single cavity mold and which is adapted for replacing the standard sprue bushing having a one inch diameter nose portion projecting from a two inch diameter base portion. The sprue bushing of the invention not only eliminates a sprue attached to the molded plastic part or article, but also eliminates the need for performing any secondary operation for finishing the surface of the article to provide a smooth attractive surface appearance. The sprue bushing of the invention is also compact and simple in construction and assembly, and may also be conveniently modified to accommodate different molding pressures.

In accordance with a preferred embodiment of the invention, a sprue bushing includes a body having a cylindrical nose portion of one inch diameter and which projects from an integral base portion having a two inch diameter. A part spherical nozzle seat is formed on the outer end of the base portion, and a small diameter discharge orifice is formed within the opposite flat end surface of the nose portion. The body is formed by two interfitting sections, and the discharge orifice connects with a cylindrical chamber which extends axially within the body sections. An elongated valve member is disposed within the chamber and has a forward small cylindrical tip portion which normally projects into the discharge orifice and has a flat end surface position flush with the end surface of the nose portion of the body.

When the pressure of the plastics material within the body chamber, reaches a predetermined level corresponding to the force exerted by the spring washers, the valve member shifts rearwardly so that the tip portion is retracted from the discharge orifice to permit the plastics material to flow into the mold cavity. When the nozzle valve of the injection molding machine is closed, the spring washers force the valve member back to its closed position. The cylindrical base portion of the bushing is also adapted to receive a band type heating element which cooperates with the internal heating element within the valve member to maintain the plastics material within the body chamber in a molten condition.

Other features and advantages of the invention will be apparent from the following description, the accompanying drawing and the appended claims.

BRIEF DESCRIPTION OF THE DRAWING

FIG. 1 is an elevational view of a sprue bushing constructed in accordance with the invention and installed in a single cavity mold shown in section, with a fragment of an injection molding machine shown in molding position;

FIG. 2 is an axial section of the sprue bushing shown in FIG. 1, taken generally on the line 2 — 2 of FIG. 3 and showing the valve member in its closed position;

FIG. 3 is a section taken generally on the line 3 — 3 of FIG. 2; and

FIG. 4 is a fragmentary section of the sprue bushing nose portion and showing the valve member in its open position.

Description of the Preferred Embodiment

FIG. 1 shows a plastics injection mold 10 constructed in two sections 12 and 14 which cooperates to define a single mold cavity 15. For purpose of illustration, the cavity 15 is effective to form a large open-top container having side walls 16 connected by a bottom wall 18. In a conventional manner, a plurality of tapered guide pins or dowels 19 are used to locate the mold section 14 precisely in relation to the mold section 12 when the sections are closed as shown in FIG. 1.

In accordance with the present invention, a sprue bushing 25 includes an elongated metal body 26 consisting of a cylindrical base portion 28 having a diameter of approximately 2 inches. The base portion 28 is integrally formed with a cylindrical nose portion 30 which projects axially from the base portion 28 and has a diameter of approximately one inch. The body 26 has a fillet or radius 31 where the nose portion 30 connects with the base portion 28. A hole or bore 32 is formed within the mold section 12 and extends from the bottom of the cavity 15 to a concentric counterbore 33. The bore 32 and counterbore 33 have substantially the same diameters as the nose portion 30 and base portion 28, respectively, and the body 26 is press fitted into the bore and counterbore.

Referring to FIG. 2, the nose portion 30 has a flat circular end or tip surface 36 which is positioned flush with the mold surface defining the bottom of the cavity 15. A part-spherical surface or seat 38 is formed on the opposite end of the body 26 and is adapted to receive the part-spherical nozzle 39 of a plastics injection molding machine 40 having a nozzle valve member 41 actuated by a fluid cylinder 42.

The body 26 of the sprue bushing 25, is constructed in two parts, a forward section 44 which includes the nose portion 30, and a rearward section 46 which interfits into the forward section 44 and is rigidly secured by a series of cap screws 47. An elongated cylindrical bore 48 is formed within the forward section 44 and the rearward section 46 of the body 26 and defines a corresponding cylindrical chamber 50. The bore 48 is connected by a frusto-conical surface 52 to a short cylindrical discharge orifice 54 formed within the center of the circular flat end surface 36 of the nose portion 30. A smaller diameter bore 56 projects from the opposite end of the bore 48 to form a radial shoulder 57, and a straight hole 58 extends outwardly from the bore 56 at an angle relative to the longitudinal axis 60 of the body 26.

An elongated generally cylindrical valve member 65 extends axially within the bore 48 and includes a slightly larger cylindrical rearward end portion 66 which is slidably mounted within the rearward end portion of the bore 48. A frusto-conical surface 68 connects the outer surfaces of the rearward and forward portions of the valve member 65.

The forward end portion of the valve member 65 is slidably supported within the bore 48 by a series of four uniformly spaced ears or spacers 71 each of which has a generally triangular or teardrop configuration and tapers to conform to the frusto-conical surface 52 so that the latter surface provides a forward limit or stop to the travel of the valve member 65. The valve member 65 also includes a frusto-conical end portion 74 which connects with a cylindrical tip portion 76 having a diameter substantially the same as the diameter of the discharge orifice 54. Thus when the valve member 65 is located in its forward position (FIG. 2), the tip portion 76 closes the discharge orifice 54, and the end surface of the tip portion 76 is located flush with the end surface 36 of the body nose portion 30.

A series of slightly concaved spring washers 80, commonly referred to as Belleville washers, are confined within the rearward end portion of the chamber 50 between the rearward end of the valve member 65 and the shoulder 57 defined between the bores 48 and 56. The spring washers 80 are arranged in opposing pairs and serve to urge or bias the valve member 65 to its normally closed position as shown in FIG. 2. The spring washers 80 are effected to produce a substantial axial force, for example, in the order of 650 pounds against the end surface of the valve member 65.

An axially extending slot 82 is formed within the rearward end portion of the valve member 65 and receives a stop member in the form of a pin 83 which is pressed into a radial hole 84 formed within the rearward section 46 of the body 26. The pin 83 serves as a stop against rearward movement or retraction of the valve member 65 to its open position as shown in FIG. 4.

A series of four uniformly spaced passages 90 extend or diverge outwardly from the center of the nozzle seat 38 through the rearward section 46 of the body 26 so that each passage 90 forms an acute angle with the longitudinal axis 60 of the body. The forward ends of the passages 90 connect with a corresponding series of passages 92 which converge inwardly and open into the chamber 50 directly in front of the frusto-conical surface 68 of the valve member 65. The passages 90 and 92 cooperate to conduct the plastics material from the nozzle 39 of the injection molding machine 40 to the annular portion of the chamber 50 surrounding the valve member 65.

As shown in FIG. 2, an elongated electrical heating element 95 is confined within an axially extending bore 96 formed within the valve member 65 and is supplied with electrical power through a pair of wires or leads 98 which extend rearwardly through the spring washers 80 and bore 56 and outwardly through the hole 58. A band type electrical heating element 100 extends around the circumference of the base portion 28 of the sprue bushing body 26 and spans or overlaps the forward section 44 and the rearward section 46 of the body. The heating element 100 is retained on the body 26 by suitable clamping bolts 101.

In operation, after the mold sections 12 and 14 are closed and it is desired to mold a part or article, the valve member 41 of the injection molding machine 40, is opened so that the plastics material is forced through the passages 90 and 92 and into the annular chamber 50. When the pressure of the plastics material within the chamber 50, reaches a predetermined level, for example, 15,000 p.s.i., the pressure acting on the frusto-conical surface 68 and on the frusto-conical surface of the portion 74 is sufficient to overcome the biasing force of the spring washers 80, causing the valve member 65 to retract to its open position as shown in FIG. 4 and permit the material to flow into the mold cavity.

After the mold cavity 15 is fully injected with the plastics material, and the valve member 41 of the injection molding machine 40 is closed, the pressure of the plastics material is released within the chamber 50. When this pressure reduces, the spring washers 80 force the valve member 65 to its closed position where the tip portion 76 of the valve member enters the discharge orifice 54. As a result of the substantial axial pressure exerted by the tip portion 76 on the plastics material within the discharge orifice 54, this small quantity of material is forced into the mold cavity.

Since the end surface of the tip portion 76 is flush with the end surface 36 of the nose portion 30 when the valve member 65 moves to its closed position, there is no sprue projecting from the molded plastic article after it is cooled and removed from the mold. The heating element 95 cooperates with the heating element 100 to prevent the molten plastics material within the annular chamber 50 from solidifying so that the cycle may be repeated to produce another part of article.

From the drawing and the above description, it is apparent that a single cavity mold incorporating a sprue bushing constructed in accordance with the present invention, provides desirable features and advantages. As mentioned above, for example, the sprue bushing 25 is compact and has the same diametric dimensions as a standard sprue bushing so that an existing bushing may be replaced by a sprue bushing 25 merely by pressing the existing bushing from the bore 32 and counterbore 33 and replacing it with a sprue bushing 25. As a result, many thousand of the existing single cavity molds may be conveniently modified to eliminate the formation of a sprue on the molded plastic part, thereby eliminating the secondary operation of removing the sprue and finishing the surface of the part. Thus the sprue bushing of the invention provides for significantly reducing the cost of molding plastic parts or articles presently being produced.

Another important feature is provided by the use of the concaved spring washers 80 within the chamber 50 in back of the valve member 65. That is, the spring washers 80 provide a substantial axial force within a small space, thereby cooperating to provide for the compact construction of the sprue bushing 25. Furthermore, the axial force produced by the spring washers 80 and/or their effective spring rate, may be conveniently and quickly changed simply by removing the rearward section 46 of the body 26 from the forward section 44 and changing the number of the washers or interchanging washers of different spring rate. Moreover, the passages 90 and 92 cooperate to direct the plastics material from the center of the seat 38 around the spring washers 80 to the annular chamber 50. While the form and use of sprue bushing herein described constitutes a preferred embodiment of the invention, it is to be understood that the invention is not limited to this precise form of sprue bushing and its illustrated application, and that changes may be made therein without departing from the scope and spirit of the invention. For example, it is to be understood that a sprue bushing of the invention may be used to replace a standard or conventional sprue bushing which feeds the runner system for multiple cavities within an existing mold. That is, when molding certain multiple cavity thin wall parts, the extended time required to solidify the larger mass of plastics material within the conventional sprue bushing, frequently determines when the mold can be opened and thus determines the cycle time of the molding operation. Since the sprue bushing of the invention eliminates the solidification of the material within the bushing, the sprue bushing significantly reduces the cycle time required for molding the parts.

We claim:

1. Apparatus for injecting a plastics material into a cavity defined by a mold, comprising an injection molding machine having a nozzle member with a forward end surface, a sprue bushing projecting into the mold and including a body having a generally cylindrical rearward surface, said body being formed by a forward body section and a rearward body section, means for securing said body sections together, said rearward body section having a seat for receiving said forward end surface of said nozzle member, said forward body section having a forward end surface forming part of the mold cavity, means defining an injection orifice within said forward end surface of said forward body section, means defining a chamber extending from said orifice axially within said body, means defining a cylindrical bore extending rearwardly of said chamber and having an end surface terminating forwardly of said seat, an elongated valve member supported for axial movement within said chamber and including a forward tip portion and a rearward end portion slidably supported within said bore, said valve member being movable between a closed position with said tip portion closing said orifice and an open position with said tip portion shifted axially from said orifice, said tip portion of said valve member having an end surface positioned generally flush with said forward end surface of said forward body section when said valve member is in said closed position, a plurality of spring washers disposed within said bore adjacent said end surface for urging said valve member toward said closed position, said valve member being movable to said open position in response to a predetermined pressure of plastics material within said chamber around said valve member, means defining a plurality of angularly disposed spaced passages within said rearward body section of said sprue bushing and extending from said seat outwardly around said bore and said spring washers to said chamber for conducting plastics material from said nozzle member to said chamber, and an electrical heating band extending around said rearward surface of said body.

2. Apparatus as defined in claim 1 including means defining an axially extending opening within said valve member, an electrical heating element extending within said opening, means defining a hole within said rearward body section and extending outwardly at an acute angle relative to the axis of said body, and electrical conductors extending through said hole and said spring washers to said heating element within said valve member.

3. Apparatus as defined in claim 1 wherein each said passage includes a first straight portion which extends from substantially the center of said seat forwardly and radially outwardly to a second straight portion which extends forwardly and radially inwardly to said chamber, and said second portion of each said passage is formed within said forward body section of said sprue bushing body.

4. The combination of claim 1 wherein said rearward body section includes a generally conical forward projection, and said forward body section defines a generally conical rearward cavity receiving and mating with said forward projection.

5. The combination of claim 1 wherein said means for securing said body sections together comprise a plurality of angularly disposed threaded fasteners extending axially into said rearward and forward body sections.

* * * * *